US006994317B2

(12) United States Patent
Fischer

(10) Patent No.: US 6,994,317 B2
(45) Date of Patent: Feb. 7, 2006

(54) REGULATING VACUUM VALVE

(75) Inventor: Richard Fischer, Rankweil (AT)

(73) Assignee: VAT Holding AG, Haag (CH)

( * ) Notice: Subject to any disclaimer, the term of this patent is extended or adjusted under 35 U.S.C. 154(b) by 26 days.

(21) Appl. No.: 10/665,856

(22) Filed: Sep. 19, 2003

(65) Prior Publication Data

US 2005/0062007 A1 Mar. 24, 2005

(51) Int. Cl.
*F16K 3/00* (2006.01)

(52) U.S. Cl. ...................... 251/193; 251/203; 251/212; 251/301

(58) Field of Classification Search ................ 251/170, 251/193, 205, 212, 298–301, 203; 137/613, 137/614.11
See application file for complete search history.

(56) References Cited

U.S. PATENT DOCUMENTS 3,145,969 A 8/1964 Von Zweck
4,094,492 A * 6/1978 Beeman et al. ............. 251/212
4,275,763 A * 6/1981 Fahrig ........................ 137/613
5,577,707 A 11/1996 Brida
5,873,562 A 2/1999 Marugg
6,325,096 B1 12/2001 Rising et al.

* cited by examiner

*Primary Examiner*—Justine R. Yu
*Assistant Examiner*—Peter deVore
(74) *Attorney, Agent, or Firm*—Reed Smith LLP

(57) ABSTRACT

A regulating vacuum valve comprises a valve housing with a through-channel, first and second valve plates which lie in adjacent and parallel planes and are mounted so as to be adjustable in their planes and can be moved into the through-channel from different sides proceeding from an open position in which they lie laterally adjacent to the through-channel to form a through-opening through the valve, the size of the through-opening being adjustable; a seal connection piece which is supported so as to be displaceable in the through-channel and is sealed relative to the valve housing, wherein, in order to provide a sealed state of the valve, the first valve plate is movable into a position in which it completely cover the through-channel and in which the seal connection piece is adjustable to the first valve plate and is accordingly sealed relative to the first valve plate by at least one sealing ring.

15 Claims, 11 Drawing Sheets

REGULATING VACUUM VALVE

BACKGROUND OF THE INVENTION a) Field of the Invention

The invention is directed to a regulating vacuum valve. In particular, the invention is directed to a regulating vacuum valve comprising a valve housing with a through-channel, first and second valve plates which lie in adjacent and parallel planes and are mounted so as to be adjustable in their planes and can be moved into the through-channel from different sides proceeding from an open position in which they lie laterally adjacent to the through-channel to form a through-opening whose size is adjustable.

b) Description of the Related Art

There are different known embodiment forms of regulating vacuum valves in which the through-cross section of the valve is adjustable and a valve plate is displaceable between a position laterally adjacent to the through-channel and a position in which the through-channel is covered. Stepping motors, for example, can be used for displacing the valve plate. In this connection, there are known regulating vacuum valves which are used only for regulating and which still have a certain residual conductivity even when closed as far as possible, and there are those which also have a sealed state in which they are closed so as to be vacuum-tight.

The displacement of the valve plate can be carried out linearly or, in case of a so-called pendulum slide, the valve plate can be adjusted by a swiveling movement around an axis vertical to the valve plate.

U.S. Pat. No. 5,577,707 discloses a vacuum valve which has a valve plate that is laterally adjacent to the valve opening in the open state and is displaceable into a position in which the valve opening is covered in order to close the valve. A ring-shaped seal connection piece is provided for sealing the valve plate relative to the valve body in the sealed state of the valve. The seal connection piece is mounted in the through-channel so as to be displaceable vertical to the plane of the valve plate and is tightly fitted to the valve plate in the sealed state of the valve. The contents of the text cited above are hereby adopted in the present application through reference.

Another vacuum valve of this type with a seal connection piece which can be adjusted to the valve plate for sealing the valve and in which, in addition, the conductivity of the valve can also be regulated is known from U.S. Pat. No. 5,873,562, whose contents are likewise adopted through reference. This patent also mentions additional references, e.g., U.S. Pat. No. 3,145,969, disclosing seal connection pieces which are adjustable at the valve plate.

A disadvantage in U.S. Pat. No. 5,873,562 consists in that the orifice opened in the regulating area is not symmetric to the axis of the through-channel so that the gas flow through the valve is asymmetric, which is undesirable in various applications, for example, in semiconductor technology.

U.S. Pat. No. 6,325,096 shows and describes various embodiment examples of regulating valves in which a symmetric flow is achieved in the regulating area. In this connection, band-shaped or plate-shaped closure members are displaced simultaneously, so that the through-cross section of the through-channel is narrowed from opposite sides simultaneously and the remaining through-opening is symmetric to the axis of the through-channel. This regulating valve has no sealed state.

OBJECT AND SUMMARY OF THE INVENTION

An important object of the invention is to provide a regulating vacuum valve which has a symmetric flow in the regulating area and which further possesses a sealed state. Another object of the invention is to provide a regulating vacuum valve of the type mentioned above which is constructed in a simple manner and facilitates maintenance.

A regulating vacuum valve, according to the invention, comprises a valve housing with a through-channel, first and second valve plates which lie in adjacent and parallel planes and are mounted so as to be adjustable in their planes and can be moved into the through-channel from different sides proceeding from an open position in which they lie laterally adjacent to the through-channel to form a through-opening through the valve, the size of the through-opening being adjustable; a seal connection piece which is supported so as to be displaceable in the through-channel and is sealed relative to the valve housing, wherein, in order to provide a sealed state of the valve, the first valve plate is movable into a position in which it completely cover the through-channel and in which the seal connection piece is adjustable to the first valve plate and is accordingly sealed relative to the first valve plate by means of at least one sealing ring.

A flow which is at least extensively symmetric at least with respect to a plane in which the valve axis lies can be achieved in the regulating area by the arrangement according to the invention. Further, in a preferred embodiment example of the invention, an at least extensively symmetric flow can be achieved with respect to a plane vertical to the plane in which the valve axis lies. In this connection, the valve plates preferably have concave recesses considered in a top view of the valve plates at their side edges facing one another in the open position, which concave recesses define the through-opening of the valve when the valve plates move into the through-channel proceeding from their open position.

Further advantages and details of the invention will be described in the following with reference to the embodiment example shown schematically in the accompanying drawings, further objects of the invention following therefrom.

DESCRIPTION OF THE PREFERRED EMBODIMENT EXAMPLES

Figure 1:
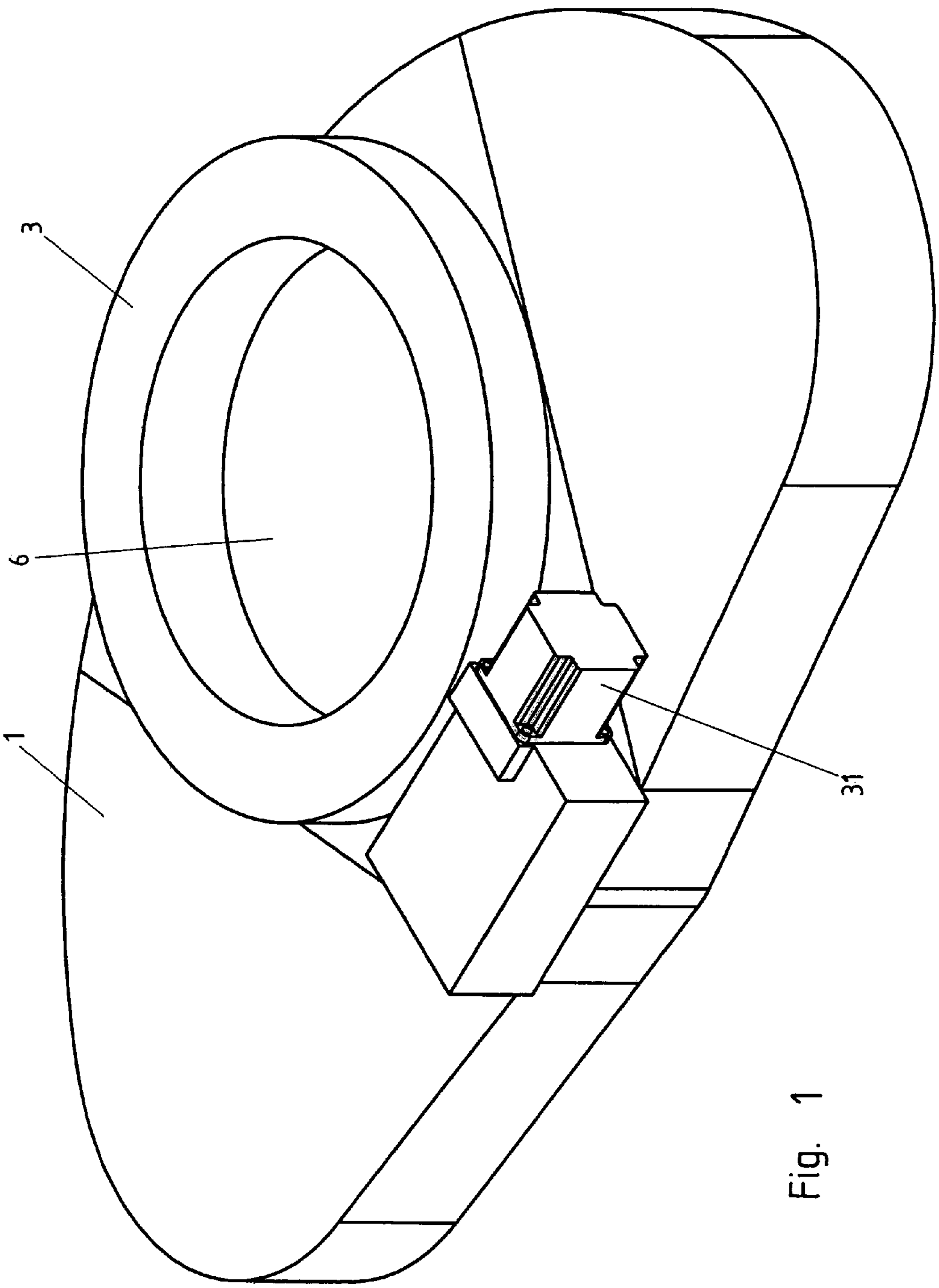
FIG. 1 shows a schematic perspective view of a valve, according to the invention, in the sealed state of the valve.
Figure 2:
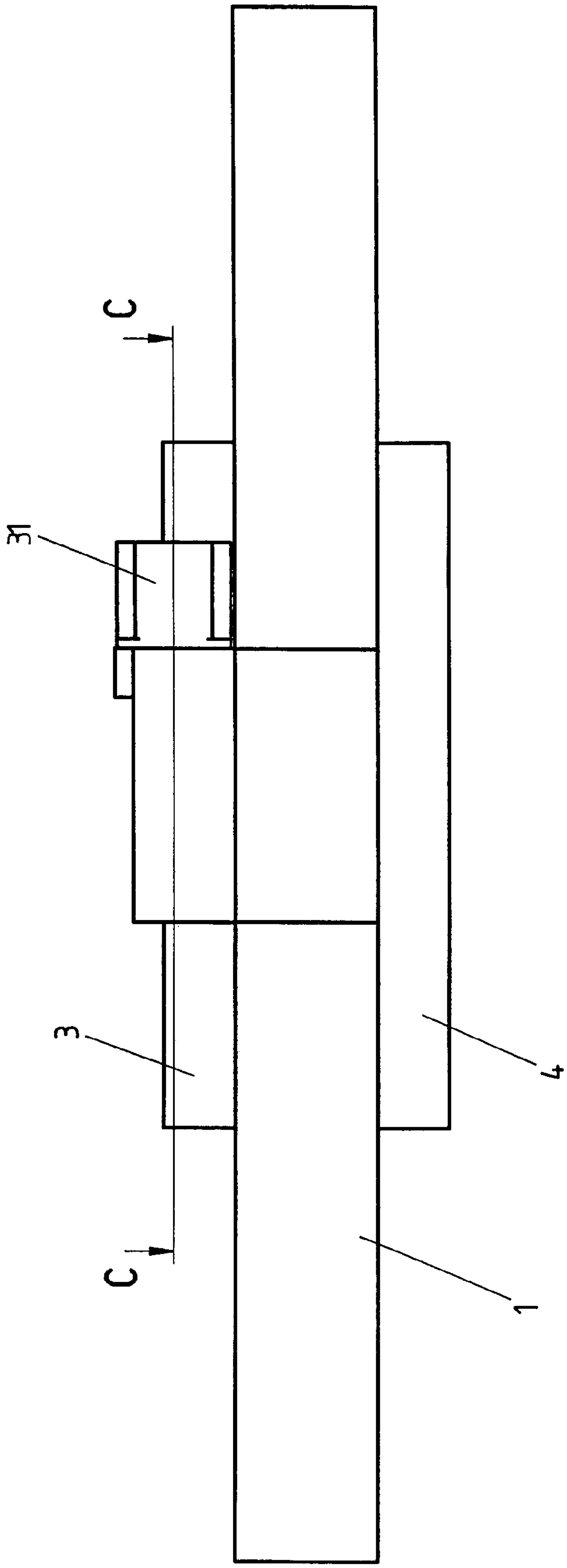
FIG. 2 shows a side view of the valve from FIG. 1.
Figure 3:
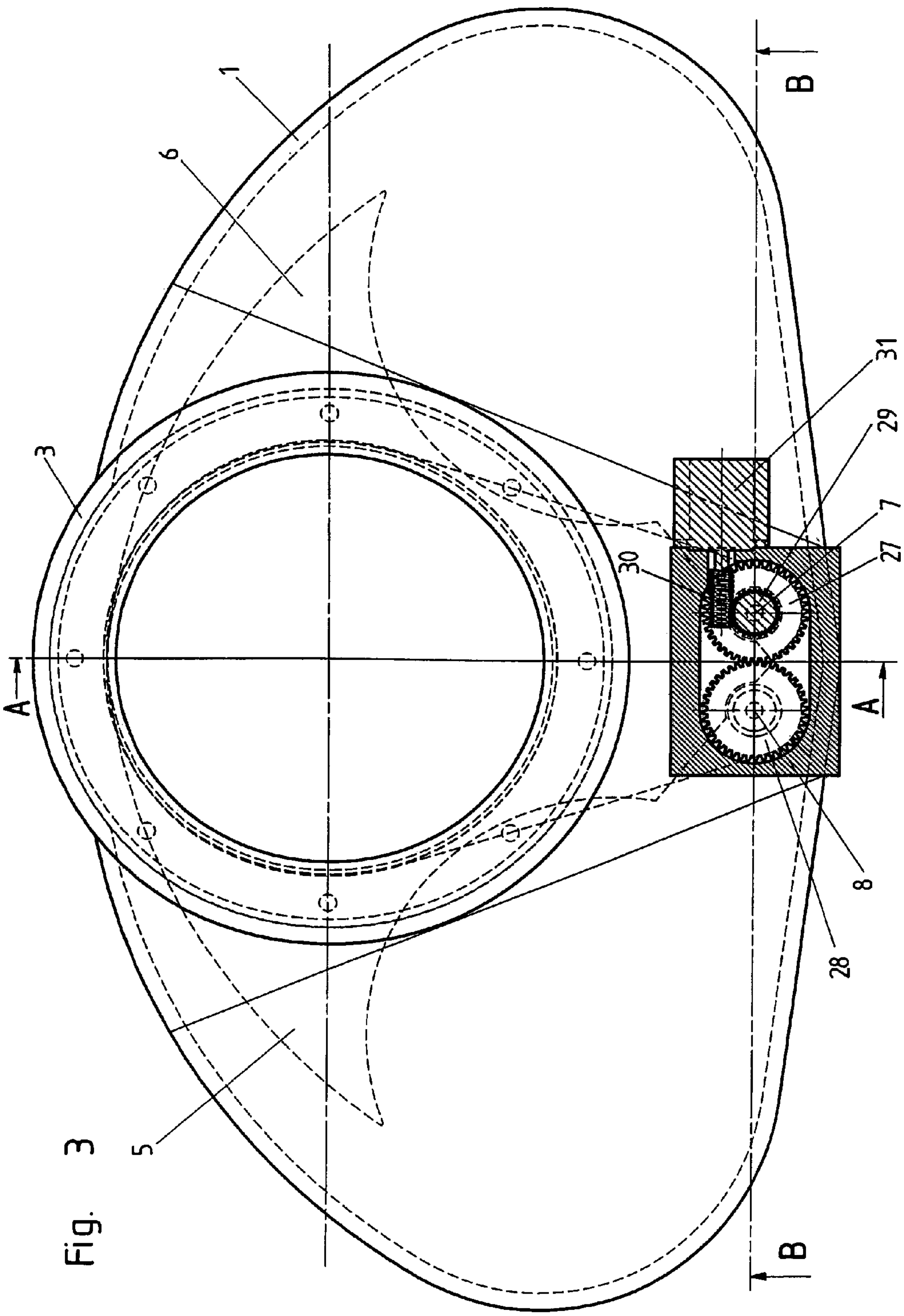
FIG. 3 shows a section along line C—C of FIG. 2.
Figure 4:
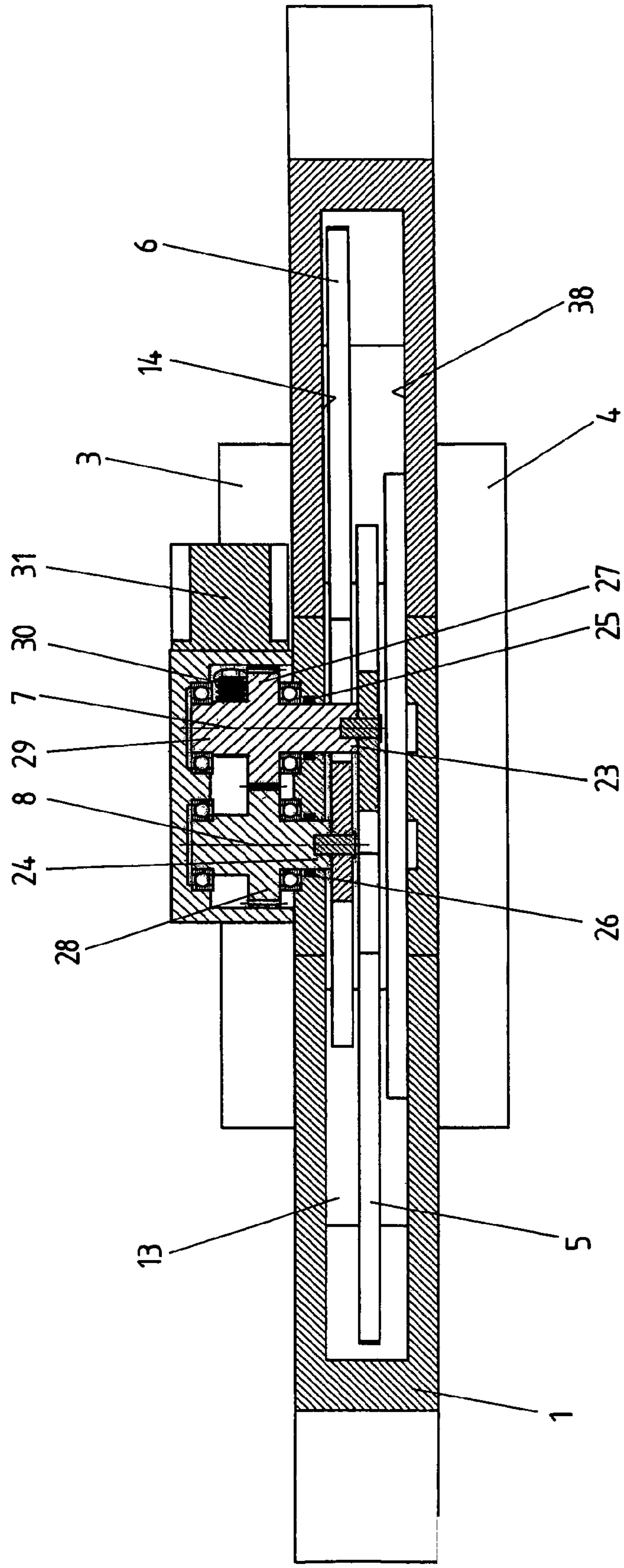
FIG. 4 shows a schematic section along line B—B of FIG. 3.

An embodiment example of a regulating vacuum valve according to the invention is shown in a simplified manner in FIGS. 1 to 11. The valve has a valve housing 1 with a through-channel 2. The connection fittings 3, 4 of the valve for connecting to a vacuum chamber and a pump, for example, are shown only schematically in the drawings. They can be constructed in a conventional manner, for example, as a clamp flange or with flange holes on the front side for screwing in flange screws and corresponding sealing elements. For the sake of simplicity, the details of these flange connections are not shown in the drawings, as was already mentioned.

First and second valve plates 5, 6 are mounted in the valve housing 1 so as to be swivelable around swiveling axes 7, 8 arranged adjacent to one another on the same side of the through-channel 2. The valve plates lie in adjacent parallel planes 9, 10.

In the fully open state of the valve (FIG. 11), the valve plates are in their open positions located laterally adjacent to the through-channel 2. They are arranged in a hollow space 13 of the value housing 1. This hollow space 13 extends to a greater or lesser extent in the area of the planes 9, 10 proceeding from the through-channel 2 on all sides. It extends farthest in the directions in which the valve plates 5, 6 are received in their open position and the least far on the side located opposite from the swiveling axes 7, 8.

In the fully closed state of the valve (FIGS. 1 to 6), the through-channel 2 is completely covered at least by the first valve plate 5, preferably also by the second valve plate 6. The hollow space 13 is defined by the first and second side walls 14, 38 viewed in the axial direction of the through-channel 2. In its position in which the through-channel 2 is completely covered, the second valve plate 6, with its side surface 39 remote of the first valve plate 5, lies opposite from a portion of the side wall 14 which adjoins the through-channel 2 and which completely surrounds the through channel 2. The second valve plate 6 can accordingly be supported along the entire edge of the through-channel 2 at the side wall 14 when a force displacing the second valve plate 6 in the direction of the side wall 14 acts on the second valve plate 6.

A seal connection piece 15 is mounted in the through-channel 2 so as to be displaceable in the direction of the valve axis 11. The seal connection piece 15 is sealed relative to the valve housing 1 by means of a sealing ring 16 which is arranged at the valve housing 1 and cooperates with a sealing surface arranged on the outside of the seal connection piece 15. In principle, it would also be conceivable and possible to provide the sealing ring 16 at the seal connection piece 15 and the sealing surface at the valve housing 1. A sealing ring 17 is arranged at the front side of the seal connection piece 15 facing the first valve plate 5. In the position of the first valve plate 5 in which the through-channel 2 is completely covered, the seal connection piece 15 can be adjusted at a sealing surface of the first valve plate 5 by its sealing ring 17 so that the seal connection piece 15 is sealed relative to the first valve plate 5. In order to adjust the seal connection piece 15, the latter has a flange 18 which extends outward into the hollow space 13. A plurality of pins 19 which project through bore holes in the valve housing 1 and are sealed relative to the latter by means of sealing rings 20 adjoin the flange 18 in circumferential direction. At their opposite end, the pins 19 are arranged at a ring piston 21 which is arranged in an annular chamber 22 of the valve housing 1. For displacement of the seal connection piece 15, the ring piston 21 can be acted upon alternately by compressed air, or compressed air can be applied in only one direction and a spring can act in the other direction. The seal connection piece 15 and the parts 18 to 22 serving to adjust it can be constructed as described in U.S. Pat. No. 5,577,707, whose contents are adopted herein through reference as was already mentioned.

In order for the valve plates 5, 6 to swivel around the swiveling axes 7, 8, the valve plates 5, 6 are fastened to swivel pins 23, 24 which are swivelable around the swiveling axes 7, 8 relative to the valve housing 1. The swivel pins 23, 24 extend through and out of bore holes arranged in the valve housing and are sealed relative to the valve housing by sealing ring 25, 26. Pinions 27, 28 which engage with one another are arranged on the portions of the swivel pins 23, 24 lying outside the valve housing 1. The adjusting movement of the two valve plates 5, 6 is coupled in this way in the present embodiment example. Further, a toothed wheel 29 is arranged at one of the two swivel pins 23 and cooperates with a worm wheel 30 that is driven by a drive motor 31, for example, a stepping motor, an AC servo motor or a DC servo motor.

On their side edges which face one another in their open positions, the valve plates 5, 6 have recesses whose depth increases proceeding from their starting points 34, 35; 34', 35'. Although it would be conceivable and possible for these recesses to have polygonal shapes, a curved shape such as a circular arc shape is preferable. The distance d between the starting points 34, 35; 34', 35' of the recesses preferably corresponds at least to the diameter of the through-channel.

The diameter of the first valve plate 5 is greater than the diameter of the through-channel 2 in every direction of plane 9 of this valve plate 5. This is also preferably true for the second valve plate 6.

Figure 5:
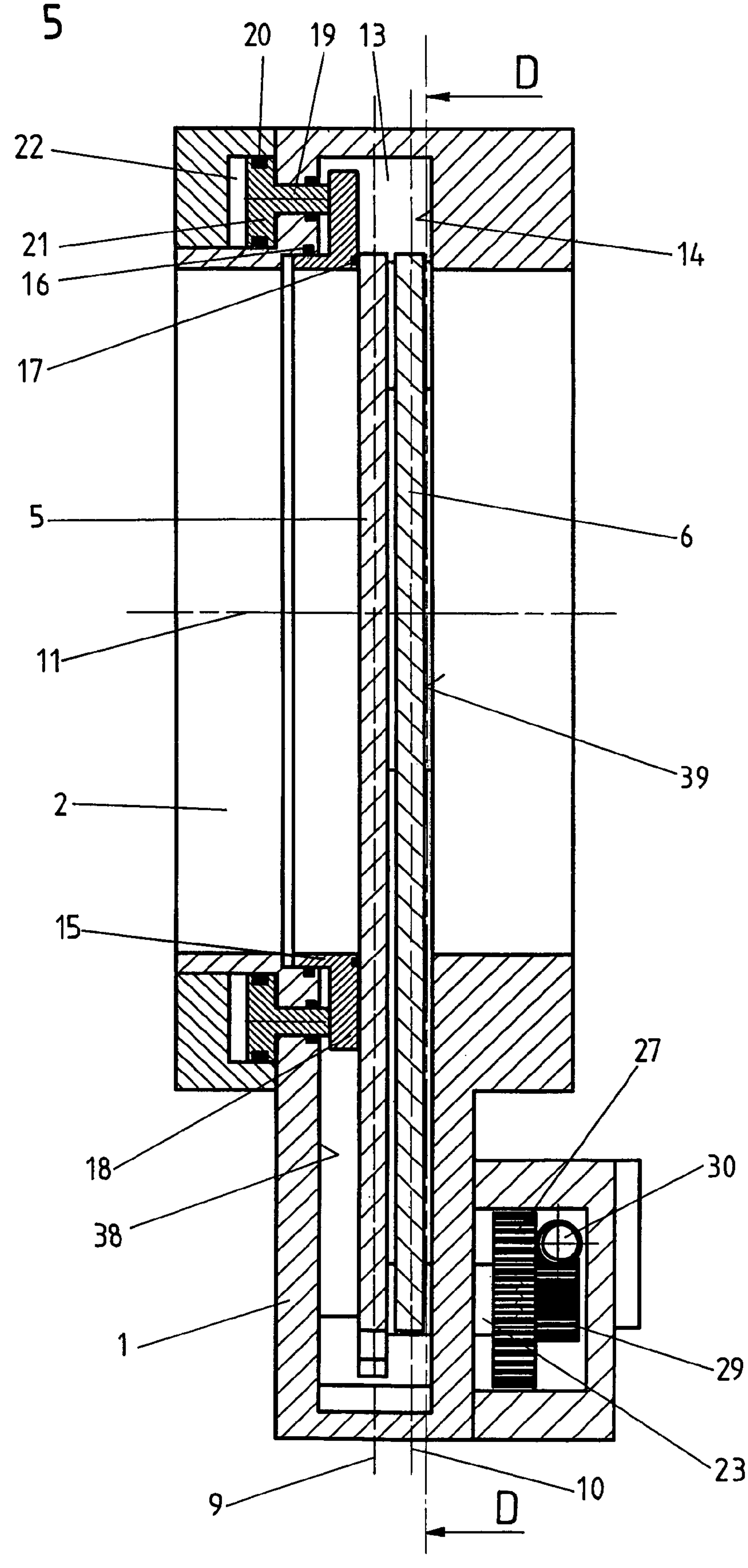
FIG. 5 shows a schematic section along line A—A of FIG. 3.
Figure 6:
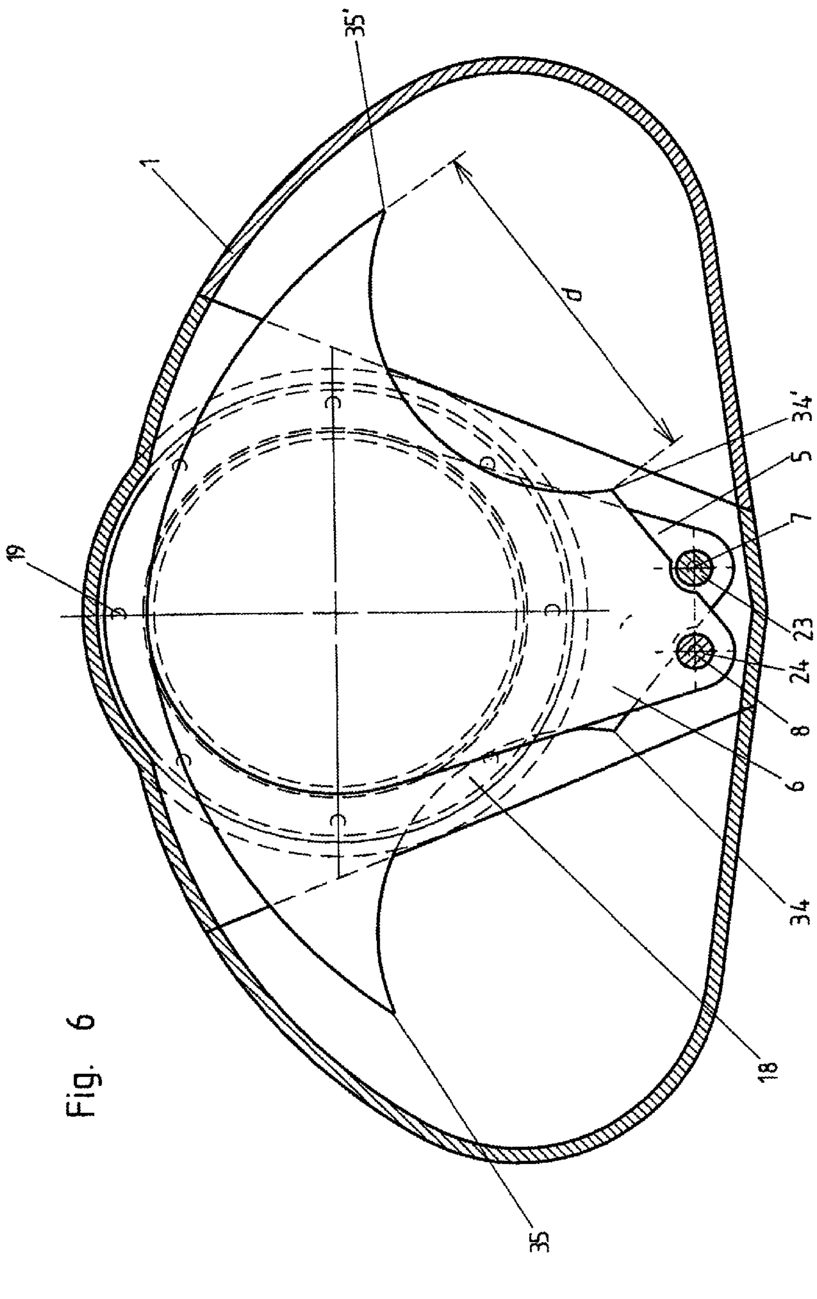
FIG. 6 shows a section along line D—D of FIG. 5.

In the sealed position of the valve corresponding to FIGS. 1 to 6, as was already described, the first valve plate 5 is in the position in which the through-channel 2 is completely covered and the second valve plate 6 also covers the through-channel 2, preferably completely, as can be seen from the drawings. Further, the seal connection piece 15 is pressed against the side surface of the first valve plate 5 facing the seal connection piece 15 in the sealed position of the valve. To receive the force exerted on the valve plate 5 in this connection, the swiveling bearing support of the valve plate 5 could be constructed so as to be correspondingly stable in axial direction. However, it is preferable that the valve plate 5 is supported against the valve plate 6 and the valve plate 6 is supported at the side wall 14. In this case, the gaps that can be seen between the valve plates 5, 6 and between valve plate 6 and the side wall 14 in the schematic view according to FIG. 5 are not present; rather, these parts rest against one another.

Figure 7:
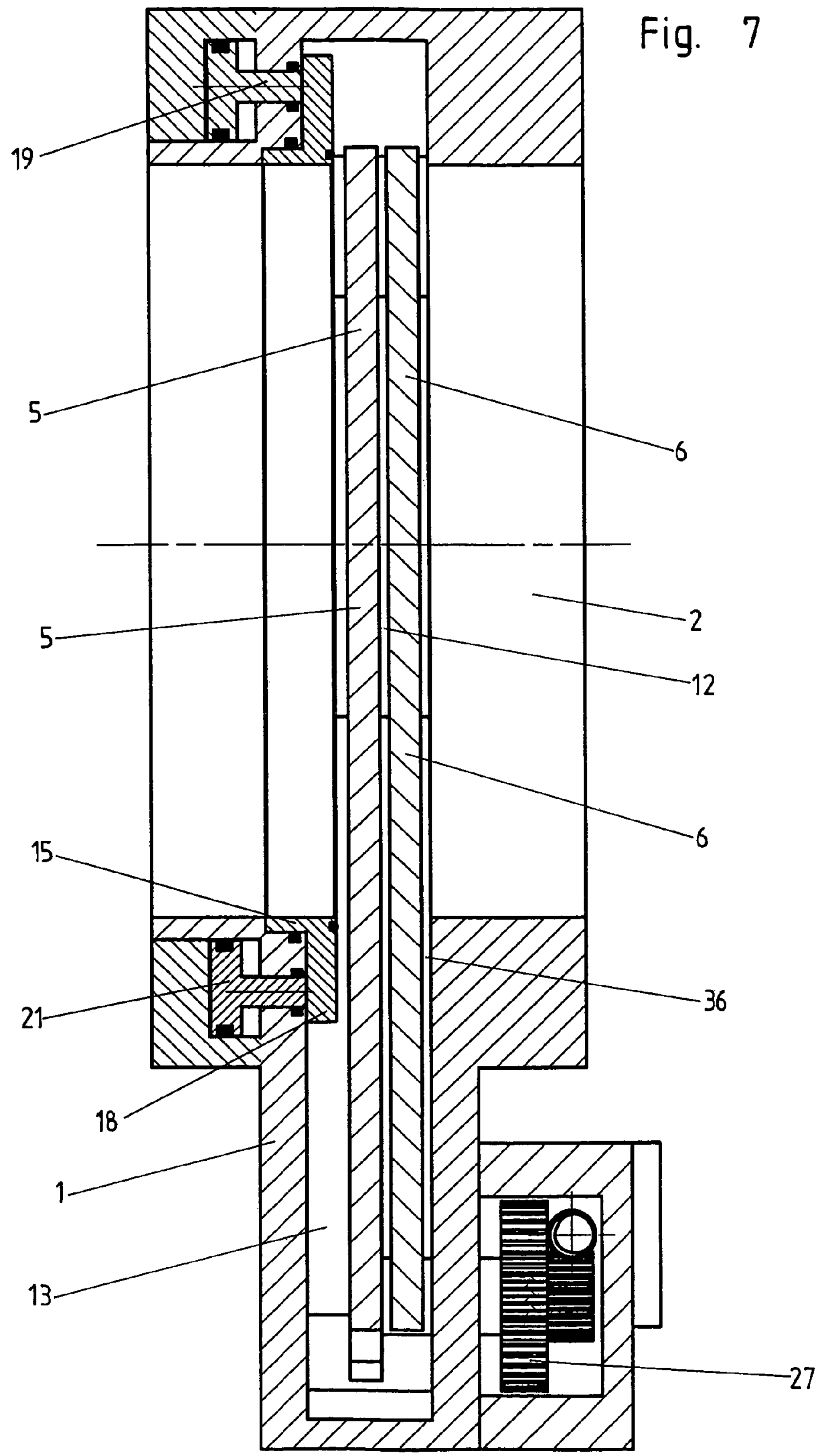
FIG. 7 shows a section corresponding to FIG. 5, but with the seal connection piece raised from the first valve plate.

When the valve is opened proceeding from the completely sealed state of the valve, the seal connection piece 15 is initially lifted from the first valve plate 5 corresponding to FIG. 7. There are gaps 12, 36 between the first and second valve plates 5, 6 and between the second valve plate 6 and the side wall 14 of the hollow space 3 at least after the seal connection piece 15 is lifted from the first valve plate 5. These gaps 12, 36 make it possible for the valve plates 5, 6 to swivel in their open positions without any mechanical friction occurring between them and between the valve plate 6 and valve housing 1; otherwise, particles would be generated and released into the vacuum. But these gaps 12, 36 are small so that the smallest conductivity that can be adjusted for the valve in this position corresponding to FIG.

7 can be kept small. For this reason, these gaps 12, 36 are preferably less than 2 mm, a value of less than 1 mm being particularly preferred.

When the first valve plate 5 rests against the second valve plate 6 in the sealed state of the valve and the second valve plate 6 rests against the side wall 14, the second valve plate 6 is lifted from the side wall 14 and the first valve plate 5 is lifted from the second valve plate 6 due to the elasticity of the valve plates 5, 6 and their bearing supports when the seal connection piece 15 is lifted from the first valve plate 5, so that the gaps 12, 36 occur between these parts.

Figure 8:
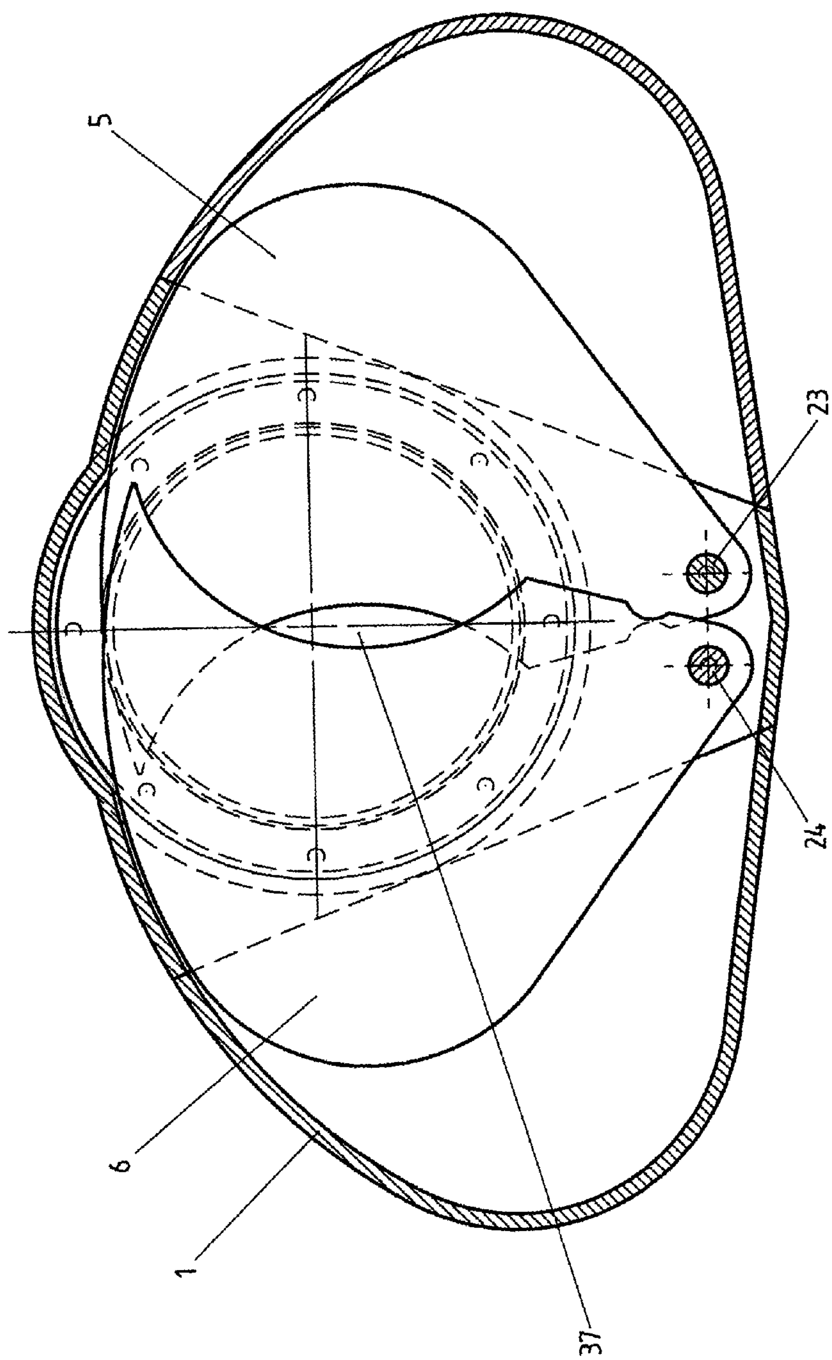
FIG. 8 shows a section corresponding to FIG. 6, but with the valve in a partly open state.
Figure 9:
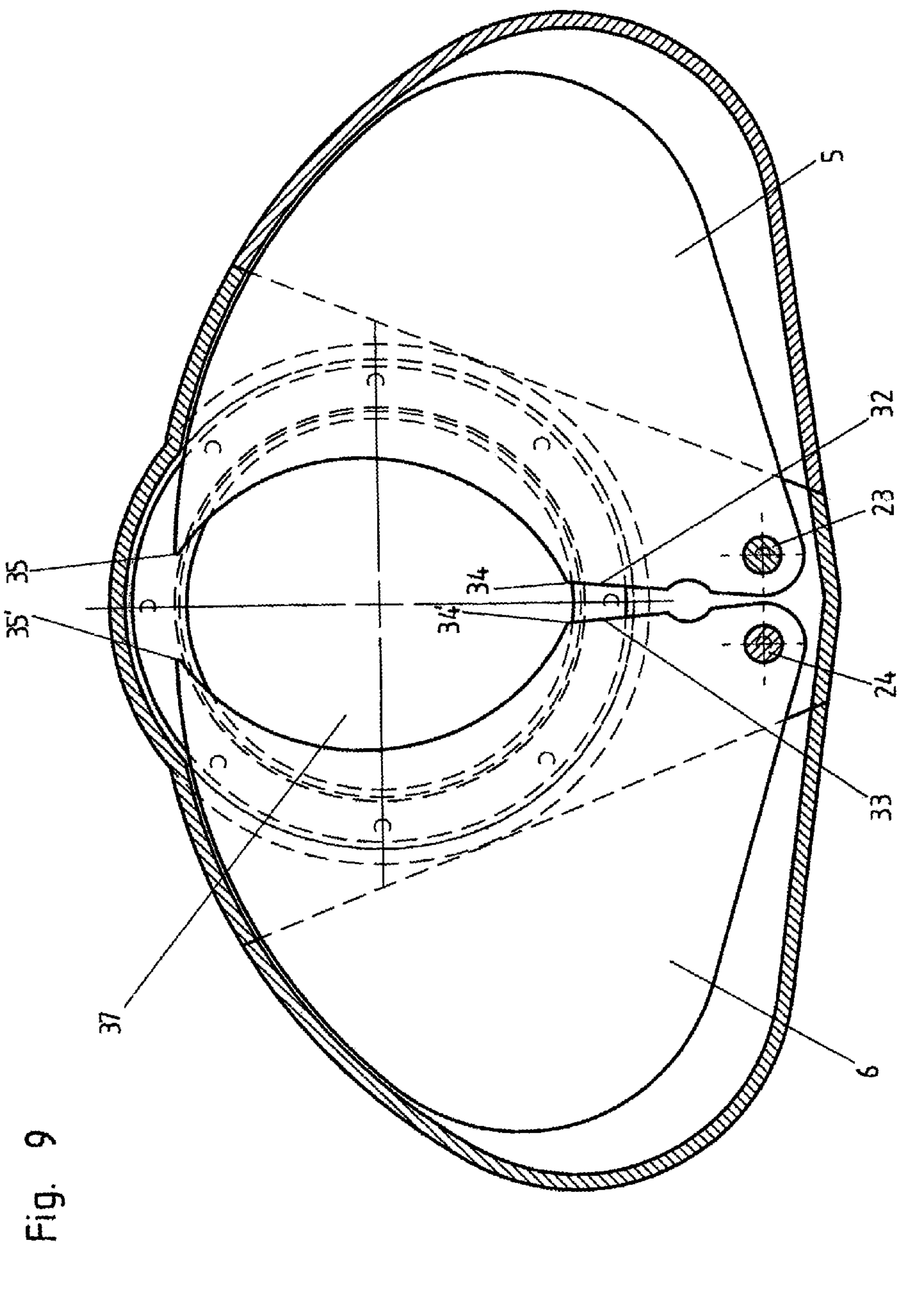
FIG. 9 shows a section corresponding to FIG. 8, wherein the valve has been opened farther.
Figure 10:
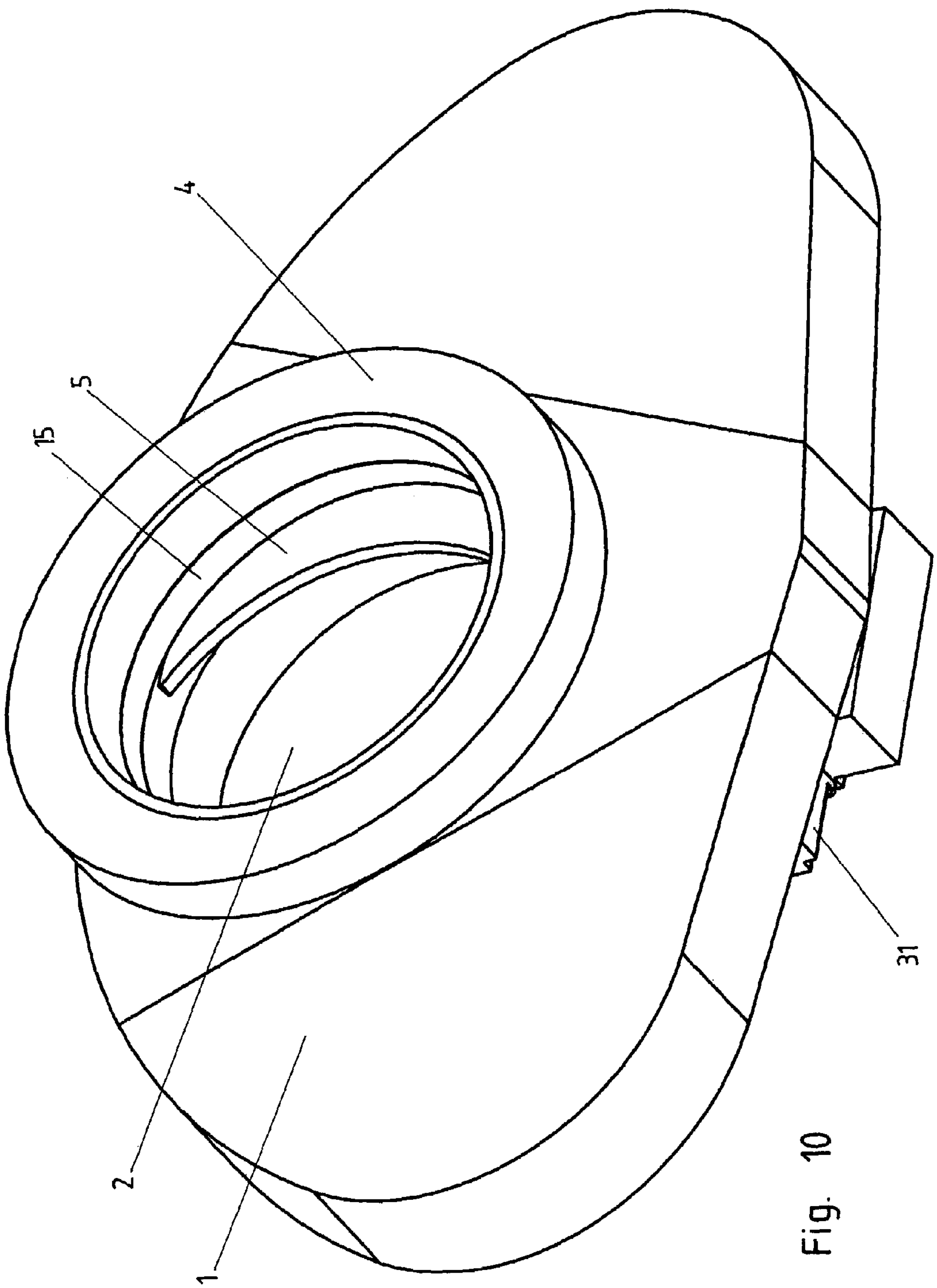
FIG. 10 shows a perspective view of the valve in the open state corresponding to FIG. 9, seen from the opposite side with respect to FIG. 1.
Figure 11:
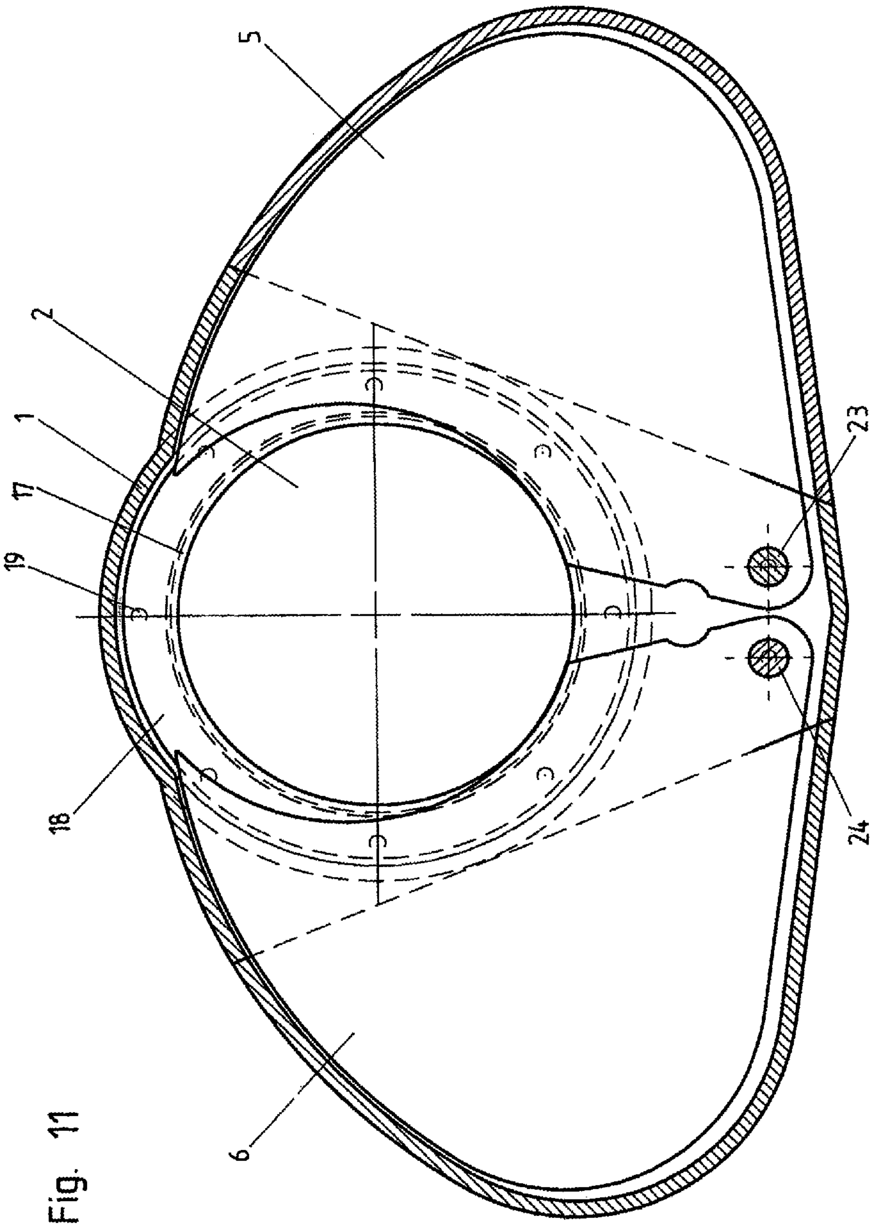
FIG. 11 shows a section corresponding to FIG. 9, but with the valve in a completely open state.

After the seal connection piece 15 is lifted from the first valve plate 6, the valve has the smallest conductivity that can be regulated. The two valve plates 5, 6 are subsequently swiveled in the direction of their open positions by means of the drive motor 31. In so doing, the conductivity of the valve initially hardly changes, if at all, until the recesses at the side edges 32, 33 of the valve plates 5, 6 begin to overlap and define a through-opening 37. The flow through the valve can be regulated by the size of this through-opening 37. Two regulating states with through-openings 37 of different sizes are shown in FIGS. 8 and 9. In the regulating state according to FIG. 9, the through-opening 37 is also defined in part, aside from the recesses in the side edges 32, 33, by the edge of the through-channel 2 through the valve housing 1. The completely open state of the valve in which the two valve plates 5, 6 lie laterally adjacent to the through-channel 2 is shown in FIG. 11.

Instead of the swiveling bearing support of the valve plates 5, 6 shown and described herein, it is also conceivable and possible in principle to support the valve plates 5, 6 so as to be linearly displaceable. In this case, a mechanical coupling of the adjusting movement of the two valve plates would be preferable, for example, by means of corresponding cable pulls.

In principle, it is also conceivable and possible to provide one or more additional valve plates in addition to the first and second valve plates; a construction with only two valve plates that are moved into the through-channel from opposite sides is preferable.

While the preceding description and the drawings depict the invention, it will be apparent to the person skilled in the art that various modifications can be carried out without departing from the true spirit and field of the invention.

REFERENCE NUMBERS

1 valve housing
2 through-channel
3 connection fitting
4 connection fitting
5 first valve plate
6 second valve plate
7 swiveling axis
8 swiveling axis
9 plane
10 plane
11 valve axis
12 gap
13 hollow space
14 side wall
15 seal connection piece
16 sealing ring
17 sealing ring
18 flange
19 pin
20 sealing ring
21 ring piston
22 annular chamber
23 swivel pin
24 swivel pin
25 sealing ring
26 sealing ring
27 pinion
28 pinion
29 toothed wheel
30 worm wheel
31 drive motor
32 side edge
33 side edge
34, 34' point
35, 35' point
36 gap
37 through-opening
38 side wall
39 side surface

What is claimed is:

1. A regulating vacuum valve comprising:

a valve housing having a through-channel;

first and second valve plates which lie in adjacent and parallel planes and are mounted so as to be adjustable in their planes and can be moved into the through-channel from different sides proceeding from an open position in which they lie laterally adjacent to the through-channel to form a through-opening through the valve, the size of the through-opening being adjustable; and an annular seal connection piece which is supported so as to be displaceable in the through-channel of the valve housing and is sealed relative to the valve housing by a first sealing ring;

wherein, in order to provide a sealed state of the valve, said first valve plate is movable into a position in which it completely covers the through-channel and in which the seal connection piece is displaceable in the through-channel between a position in which it is lifted from the first valve plate to a position in which it is pressed against the first valve plate and sealed relative to the first valve plate by at least one second sealing ring.

2. The regulating vacuum valve according to claim 1, wherein in the position of the first valve plate in which the through-channel is completely covered, the second valve plate also occupies a position in which it completely covers the through-channel.

3. The regulating vacuum valve according to claim 1, wherein the valve housing has a hollow space in the area of planes in which the valve plates are arranged, which hollow space extends on all sides proceeding from the through-channel, the valve plates being movable in the hollow space when moving into their open position.

4. The regulating vacuum valve according to claim 3, wherein the hollow space is defined by the first and second side walls viewed in axial direction, and in the position of the second valve plate in which the through-channel s completely covered the second valve plate, with its side surface remote of the first valve plate, lies opposite from a portion of the side wall of the hollow space adjoining the through-channel so as to be supported at the side wall when the seal connection piece rests against the first valve plate and the first valve plate accordingly rests against the second valve plate.

5. The regulating vacuum valve according to claim 1, wherein the valve plates have, on their side edges which face one another in their open positions, recesses whose depth increases proceeding from their starting points.

6. The regulating vacuum valve according to claim 5, wherein the distances between the starting points at which the recesses start are at least equal to the diameter of the through-channel.

7. The regulating vacuum valve according to claim 5, wherein the recesses are substantially defined in a circular arc shape.

8. The regulating vacuum valve according to claim 1, wherein the first valve plate and the second valve plate are mechanically coupled in their displacing movements.

9. The regulating vacuum valve according to claim 1, wherein the valve plates are supported so as to be swivelable around swiveling axes extending vertical to the planes of the valve plates.

10. The regulating vacuum valve according to claim 9, wherein the swiveling axes of the valve plates are arranged adjacent to one another on the same side of the through-channel.

11. The regulating vacuum valve according to claim 9, wherein the valve plates are fastened to swivel pins which are swivelable around the swiveling axes and which are guided out through bore holes in the valve housing so as to be sealed relative to the valve housing.

12. The regulating vacuum valve according to claim 11, wherein pinions which engage with one another are provided for coupling the swiveling movement of the valve plates at the swivel pins.

13. The regulating vacuum valve according to claim 12, wherein one of the two swivel pins can be driven by a drive motor.

14. The regulating vacuum valve according to claim 3, wherein the seal connection piece has a flange which projects into the hollow space and which connects a plurality of axially adjustable pins which project through bore holes in the valve housing and are sealed relative to the valve housing.

15. The regulating vacuum valve according to claim 14, wherein the pins are adjustable jointly by means of a ring piston which is arranged in an annular chamber of the valve housing.

* * * * *